(12) United States Patent
Barry et al.

(10) Patent No.: US 7,590,061 B2
(45) Date of Patent: Sep. 15, 2009

(54) APPARATUS AND METHOD OF CONTROLLED DELAY PACKET FORWARDING

(75) Inventors: Charles F. Barry, Santa Clara, CA (US); Tian Shen, Cupertino, CA (US); Feng F. Pan, San Jose, CA (US); Meenakshi Subramanian, Santa Clara, CA (US); Hank P. Nguyen, San Jose, CA (US)

(73) Assignee: Brilliant Telecommunications, Inc., Campbell, CA (US)

( * ) Notice: Subject to any disclaimer, the term of this patent is extended or adjusted under 35 U.S.C. 154(b) by 0 days.

(21) Appl. No.: 11/843,493

(22) Filed: Aug. 22, 2007

(65) Prior Publication Data

US 2008/0089364 A1  Apr. 17, 2008

Related U.S. Application Data

(60) Provisional application No. 60/839,465, filed on Aug. 22, 2006.

(51) Int. Cl.
*H04J 3/16* (2006.01)
*H04J 3/06* (2006.01)
*H04L 12/54* (2006.01)
*H04L 12/56* (2006.01)
*G06F 15/16* (2006.01)

(52) U.S. Cl. .................. 370/230; 370/238; 370/412; 370/428; 370/516; 709/232; 709/240

(58) Field of Classification Search .................. None
See application file for complete search history.

(56) References Cited

U.S. PATENT DOCUMENTS

| | | | |
|---|---|---|---|
| 5,757,771 A * | 5/1998 | Li et al. | 370/235 |
| 5,790,543 A * | 8/1998 | Cloutier | 370/252 |
| 6,122,254 A * | 9/2000 | Aydemir et al. | 370/235 |
| 6,556,572 B1 * | 4/2003 | Ishida | 370/395.41 |
| 6,570,872 B1 * | 5/2003 | Beshai et al. | 370/369 |
| 6,647,428 B1 | 11/2003 | Bannai et al. | |
| 6,680,912 B1 | 1/2004 | Kalman et al. | |
| H2103 H * | 5/2004 | Modiano | 370/230 |
| 6,741,559 B1 * | 5/2004 | Smeulders et al. | 370/230 |
| 6,865,149 B1 | 3/2005 | Kalman et al. | |
| 6,983,393 B2 * | 1/2006 | Truchard et al. | 713/500 |
| 7,230,952 B2 * | 6/2007 | Beshai | 370/412 |
| 7,251,256 B1 | 7/2007 | Barry et al. | |
| 7,260,102 B2 * | 8/2007 | Mehrvar et al. | 370/412 |
| 7,272,144 B2 * | 9/2007 | Cloonan et al. | 370/395.42 |
| 7,277,962 B2 * | 10/2007 | Zhang et al. | 709/240 |

(Continued)

OTHER PUBLICATIONS

"Synchronization Services for NGN, Applications and Deployment Challenges," Cisco Systems, Inc., WSTS' 07, Boulder—Mar. 14, 2007.

*Primary Examiner*—Gregory B Sefcheck
(74) *Attorney, Agent, or Firm*—Cooley Godward Kronish LLP (57) ABSTRACT

An apparatus and method are described for forwarding of packets with controlled delay. In one embodiment, the invention includes controlled delay queuing logic to hold a packet in a first class for a queuing time of at least a controlled delay value, and scheduling logic to determine whether to delay transmission of a packet in a second class to allow the transmission of the packet in the first class when the queuing time reaches the controlled delay value.

17 Claims, 6 Drawing Sheets

U.S. PATENT DOCUMENTS

| | | | |
|---|---|---|---|
| 2002/0085582 A1* | 7/2002 | Kim | 370/445 |
| 2003/0002539 A1* | 1/2003 | Soda et al. | 370/509 |
| 2003/0137997 A1* | 7/2003 | Keating | 370/519 |
| 2004/0001493 A1* | 1/2004 | Cloonan et al. | 370/395.42 |
| 2004/0196857 A1* | 10/2004 | Holloway et al. | 370/401 |
| 2007/0147435 A1* | 6/2007 | Hamilton et al. | 370/503 |
| 2007/0256078 A1* | 11/2007 | Falk et al. | 718/104 |
| 2008/0137691 A1* | 6/2008 | Barry et al. | 370/503 |

\* cited by examiner

APPARATUS AND METHOD OF CONTROLLED DELAY PACKET FORWARDING

CROSS-REFERENCE TO RELATED APPLICATIONS

This application claims priority to U.S. Provisional Application Ser. No. 60/839,465, filed Aug. 22, 2006, which is incorporated by reference in its entirety.

FIELD OF THE INVENTION

The present invention relates generally to processing of packet traffic in computer networks. More particularly, this invention is directed towards forwarding packets with controlled delay at each network device to minimize the accumulation of jitter.

BACKGROUND OF THE INVENTION

In recent years, there has been a rapid increase in demand for delivery of real-time applications and services in computer networks, including Pseudo-Wire Emulation (PWE), Voice over IP (VoIP), video conferencing, and broadcast, multicast and manycast streaming services such as H.261, H.323, and IPTV. These real-time services may require highly accurate timing to ensure high service quality. For example, it is desirable to eliminate data loss due to clock mismatch between the source and the destination. This can be done by providing a highly accurate timing reference at the source and at the destination, such as a Global Positioning System (GPS) reference or a lower quality oscillator such as a Stratum 2 rubidium oscillator, where the specification for Stratum 2 clock quality is given in Telcordia GR-1244-CORE. However, at the same time it is desirable to reduce the substantial cost resulting from per-node deployment of these timing references.

Figure 1:
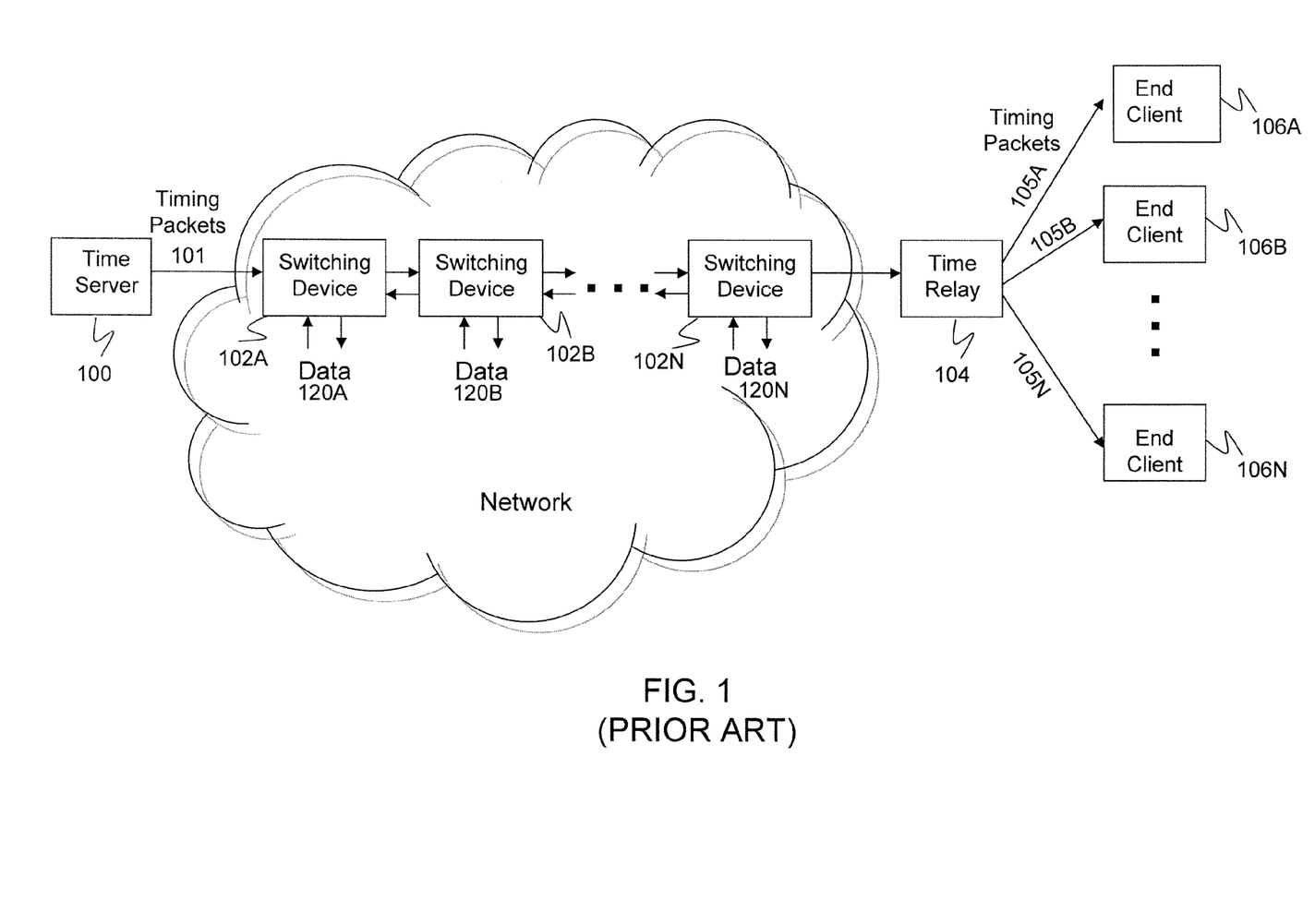
FIG. 1 illustrates a network architecture including a single time server that provides timing information to client devices, in accordance with the prior art.

FIG. 1 illustrates a network architecture including a single time server 100 that provides timing information to client devices 106A-106N. The time server 100 may be a Network Time Protocol (NTP) server, and the timing information may be contained in timing packets 101 that traverse network 110 to a time relay server 104. These timing packets 101 traverse switching devices 102A-102N in network 110. At each switching device 102, the timing packets 101 are multiplexed with data packets 120. Each switching device 102 may use conventional queuing such as store-and-forward queuing. The time relay server 104 may synchronize to the timing information from the time server 100 contained in timing packets 101, and may generate and transmit timing information contained in timing packets 105A-105N to the clients 106A-106N. The clients 106 may synchronize to the timing packets 105 received from the time relay server 104.

One of the important factors that limits the timing accuracy is variations in network delay, known as network jitter, experienced by the timing packets 101 due to multiplexing with the data packets 120. The minimization of network jitter, and correspondingly the tight bounding of network delay experienced by the timing packets 101, enhances the timing accuracy of timing distribution protocols, and improves the quality of real-time network applications and services. The timing accuracy of the timing distribution protocol NTPv4 over the public Internet may be on the order of 10 milliseconds; in local area networks, the timing accuracy of NTPv4 may be better, on the order of hundreds of microseconds. In practice an incoming jitter with a standard deviation of 100 nanoseconds on a Stratum 1 referenced clock can be filtered to provide Stratum 2 quality timing distribution, which is desirable to remove the need for a GPS reference or a Stratum 2 rubidium oscillator at each client 106. However, the timing accuracy of conventional NTPv4 implementations appear to be far from what is needed for distribution of Stratum 2 quality timing.

In packet networks the delays are primarily the station to station transmission delay over the physical media and transit hop delay. A packet, such as timing packet 101, experiences transmission delay between transit stations such as switching devices 102, and transit hop delays, including media access control (MAC) delay and queuing delay, at each switching device 102. End-to-end delay is the total delay that the timing packet 101 experiences from the source, such as time server 100, to the destination, such as time relay 104. The end-to-end delay includes, in addition to all the delays experienced per transit hop, MAC and queuing delays at the source and destination nodes.

Transmission delay is the delay due to the distance the signal travels at the speed of light over the associated physical media. In normal operation, transmission delay is slowly varying due to thermal and diurnal effects. Delay variation that is slowly varying is known as wander. Transmission wander due to thermal and diurnal effects in most networks is generally small, on the order of 100 nanoseconds over 5000 kilometers of fiber, and can be tracked and easily compensated.

Figure 2:
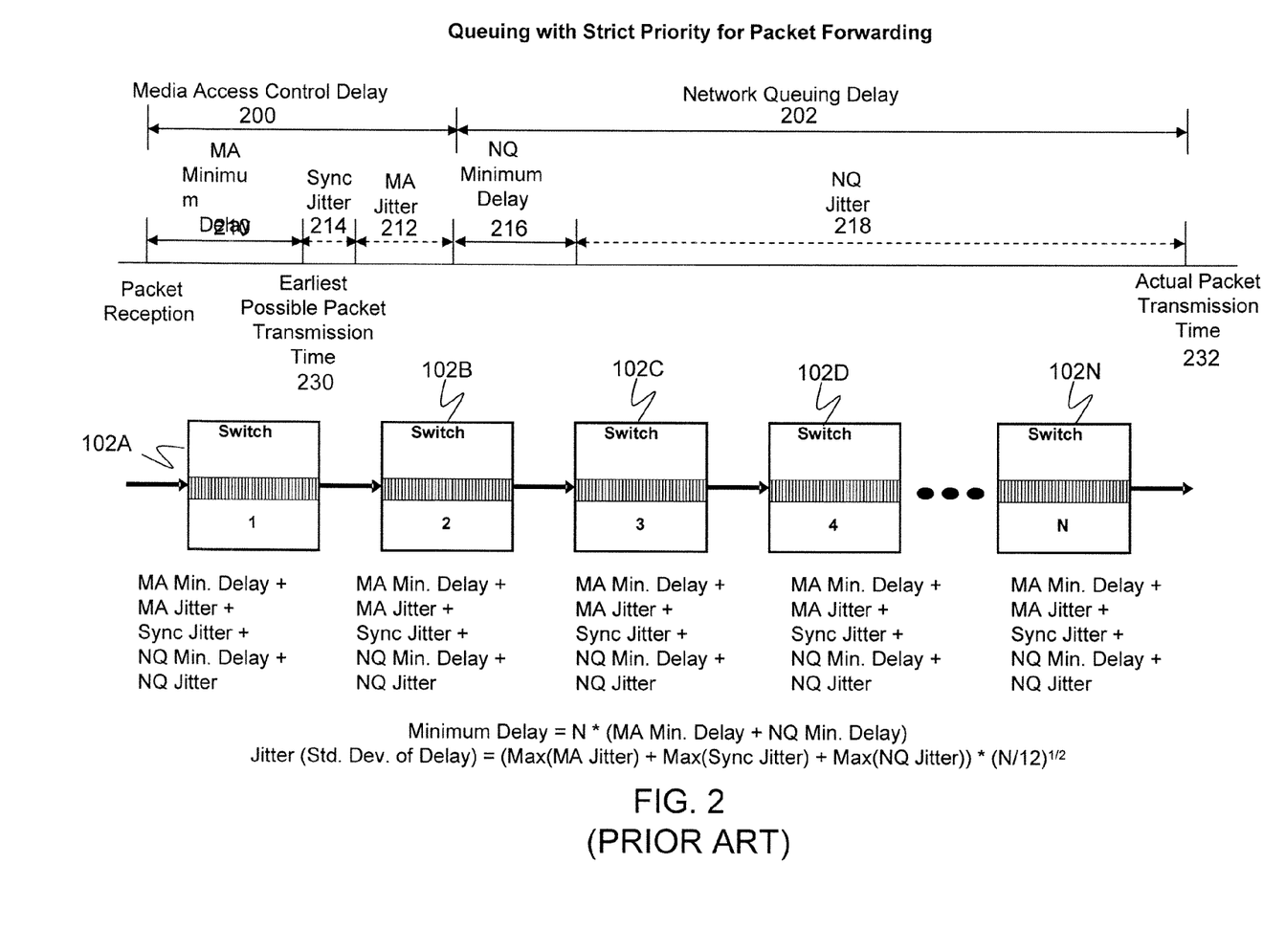
FIG. 2 illustrates the components of media access control delay and network queuing delay, and the accumulation of these components as a timing packet traverses network switches, in accordance with the prior art.

FIG. 2 illustrates the components of media access control delay 200 and network queuing delay 202, and the accumulation of these components as a timing packet 101 traverses network switches 102. The media access control delay 200 includes media access (MA) minimum delay 210, MA jitter 212, and synchronization jitter 214. The network queuing delay 202 includes network queuing (NQ) minimum delay 216 and NQ jitter 218. A packet transiting network switch 102, such as a timing packet 101, may experience as little delay as (MA minimum delay 210+NQ minimum delay 216) before transmission at the earliest possible packet transmission time 230. In this case, all of the components of jitter are zero. Generally a packet transiting network switch 102 may experience a delay of (MA minimum delay 210+MA jitter 212+Synchronization jitter 214+NQ minimum delay 216+NQ jitter 218) before transmission at the actual packet transmission time 232. The minimum transit delay accumulated through N network switches 102 may be N*(MA minimum delay 210+NQ minimum delay 216). The jitter through N network switches 102 may be uniformly distributed with standard deviation (Max(MA jitter 212)+Max (Synchronization jitter 214)+Max(NQ jitter 218))*(N/12)$^{1/2}$.

The MA delay 200 is due to the protocols that schedule transmissions on the physical media, and depends upon bit transmission rate, inter-packet gaps, packet fragmentation, inverse multiplexing and similar effects. In the case of a point-to-point full duplex Ethernet link operating at 100 Mbps, the MA delay 200 is primarily due to the 96-bit Inter-Packet Gap (IPG) between the start of a packet transmitted from a MAC device within network switch 102 and the end of the preceding packet, plus some MA minimum delay 210 that includes minimum MAC processing delay. Traditional queuing approaches, such as store-and-forward transit queuing, allow a packet transiting network switch 102, such as a timing packet 101, to be unpredictably delayed. This is because the full 96-bit IPG or a portion thereof may need to be inserted on the outgoing link after the end of transmission of a packet inserted at network switch 102, such as a data packet 120. At 100 Mbps, this MA jitter 212 due to IPG is 0 to 96 bits, or 0 to 960 nanoseconds. Since each network device along the path from the time server 100 to the clients 106 can experience MA jitter 212, the standard deviation of the accumulated end-to-end jitter across multiple network switches 102 due to MA jitter 212 alone can far exceed the 100 nanosecond target for Stratum 2 timing distribution. For example, the standard deviation of the accumulated jitter after 100 network switches 102 due solely to MA jitter 212 is 960 nanoseconds*$(100/12)^{1/2}$=2.77 microseconds. This means that traditional store-and-forward transit queuing may not be acceptable for highly accurate transmission of Stratum time and frequency in a packet network.

A secondary source of variation in the MAC delay 200 is due to synchronization required to prevent flip-flop multi-stability when passing packet data across clock domains. The uncertainty for each synchronization stage may be one clock cycle of the synchronizing clock. For example, after the timing packet 101 is received at a network switch 102, the timing packet 101 may be transmitted on the next rising edge of the transmit MAC interface clock at the network switch 102. In this case, the synchronization jitter 214 may be bounded by one clock cycle of the transmit MAC interface clock. In 100 Mbps Ethernet the underlying rate of the transmit MAC interface clock is 100 MHz. The resulting synchronization jitter is uniformly distributed and bounded between 0 to 10 nanoseconds per network switch 102. The standard deviation of the accumulated jitter after 100 network switches 102 due solely to synchronization jitter 214 is 10 nanoseconds*$(100/12)^{1/2}$=28.86 nanoseconds. This means that the standard deviation of the accumulated synchronization jitter 214, by itself, appears to be within the 100 nanosecond target for distribution of Stratum 2 quality timing.

Network queuing delay 202 is perhaps the largest source of delay and jitter in a network. Network queuing can be caused by output port contention arising from packets arriving from a multiplicity of input ports with the same desired output port, such as a transit timing packet 101 and an incoming data packet 120 multiplexed at network switch 102. Only a single packet can egress the network switch 102 at any given time, so any other contending packets may be queued or dropped. The magnitude of the NQ minimum delay 216 and the NQ jitter 218 is shown for a representative example. Implementations of standard Ethernet have a maximum packet size, or Maximum Transfer Unit (MTU), of 1518 bytes. Not including the IPG transmission time, the transmission time for a 1518 byte packet at 100 Mbps may be 121.44 microseconds. The transmission time for a minimum size 64 byte packet may be 5.12 microseconds. In a 100 Mbps Ethernet store and forward network, the NQ minimum delay 216 may be 5.12 microseconds, such as for the queuing time of a 64 byte timing packet 101 with no packet directly in front of it or multiplexed with it. Assuming that the timing packet 101 has strict priority over all data packets 120, the maximum NQ jitter 218 may be 121.44 microseconds, such as for the queuing time of a 64 byte timing packet 101 waiting for a full 1518 byte data packet 120 to be multiplexed in front of it. (Note that delays far in excess of 1 millisecond may occur otherwise.) This NQ jitter 218 may happen at every network switch 102 traversed by the timing packet 101 as it is forwarded from the time server 100 to the time relay server 104. The standard deviation of the accumulated jitter after 100 network switches 102 due solely to NQ jitter 218 may be at least 121.44 microseconds*$(100/12)^{1/2}$=350.57 microseconds. (Note that in real networks, the standard deviation of the accumulated NQ jitter 218 may be much higher than this due to the self-similar nature of many network traffic patterns.) This means that the standard deviation of the accumulated NQ jitter 218, by itself, appears to be far in excess of the 100 nanosecond target for distribution of Stratum 2 quality timing.

The above discussion shows that the standard deviation of the jitter accumulated by timing packets 101 that traverse many network switches 102 using conventional store-and-forward queuing appears to be far higher than the target standard deviation that can be filtered to provide highly accurate network timing, such as 100 nanoseconds for Stratum 2 timing. Moreover, the statistics of this accumulated jitter may depend heavily on highly self-similar traffic patterns and thus may be extremely complex to filter. To address this shortcoming, it would be desirable to provide a mechanism for forwarding packets at each network switch 102 that eliminates most or all of the MA jitter 212 and the NQ jitter 218, which appear to be, by orders of magnitude, the primary sources of jitter accumulation impacting the transiting of timing packets 101. This may enable timing packets 101 to be distributed with a standard deviation of accumulated jitter of less than 100 microseconds. The elimination or reduction of the NQ jitter 218 may also substantially simplify any filtering that may need to be performed.

SUMMARY OF THE INVENTION

An apparatus and method are described for forwarding of packets with controlled delay. One embodiment of the invention includes controlled delay queuing logic to hold a packet in a first class for a queuing time of at least a controlled delay value. Scheduling logic determines whether to delay transmission of a packet in a second class to allow the transmission of the packet in the first class when the queuing time reaches the controlled delay value.

A method is also described for synchronizing a client to a time server. Timing packet information is generated at the time server. The timing packet information is forwarded through at least one switching device. This forwarding operation includes determining at the at least one switching device whether to delay transmission of data packet information until after a queuing time of the timing packet information reaches a controlled delay value. The timing packet information is received at the client. The timing of the client is synchronized based on processing of the timing packet information.

BRIEF DESCRIPTION OF THE DRAWINGS

For a better understanding of the nature and objects of the invention, reference should be made to the following detailed description taken in conjunction with the accompanying drawings, in which.

DETAILED DESCRIPTION OF THE INVENTION

Controlled delay packet forwarding can eliminate most or all of the jitter per transit hop by trading off increased delay per hop with reduced jitter per hop. Controlled delay packet forwarding works by applying a sufficiently large controlled delay to controlled delay packets so that controlled delay packets do not experience the largest jitter sources per transit hop, such as MA jitter 212 or NQ jitter 218. This can ensure predictable delay and jitter for forwarding of controlled delay packets at each transit hop. Controlled delay packet forwarding is particularly useful for timing packets, such as NTP packets distributed from a time server, that have strict jitter accumulation requirements and that may traverse many transit hops. Using controlled delay packet forwarding, NTP unicast, manycast, multicast, and broadcast packets can be forwarded through each transit hop with nearly constant delay, and with small and statistically well-behaved jitter.

Figure 3:
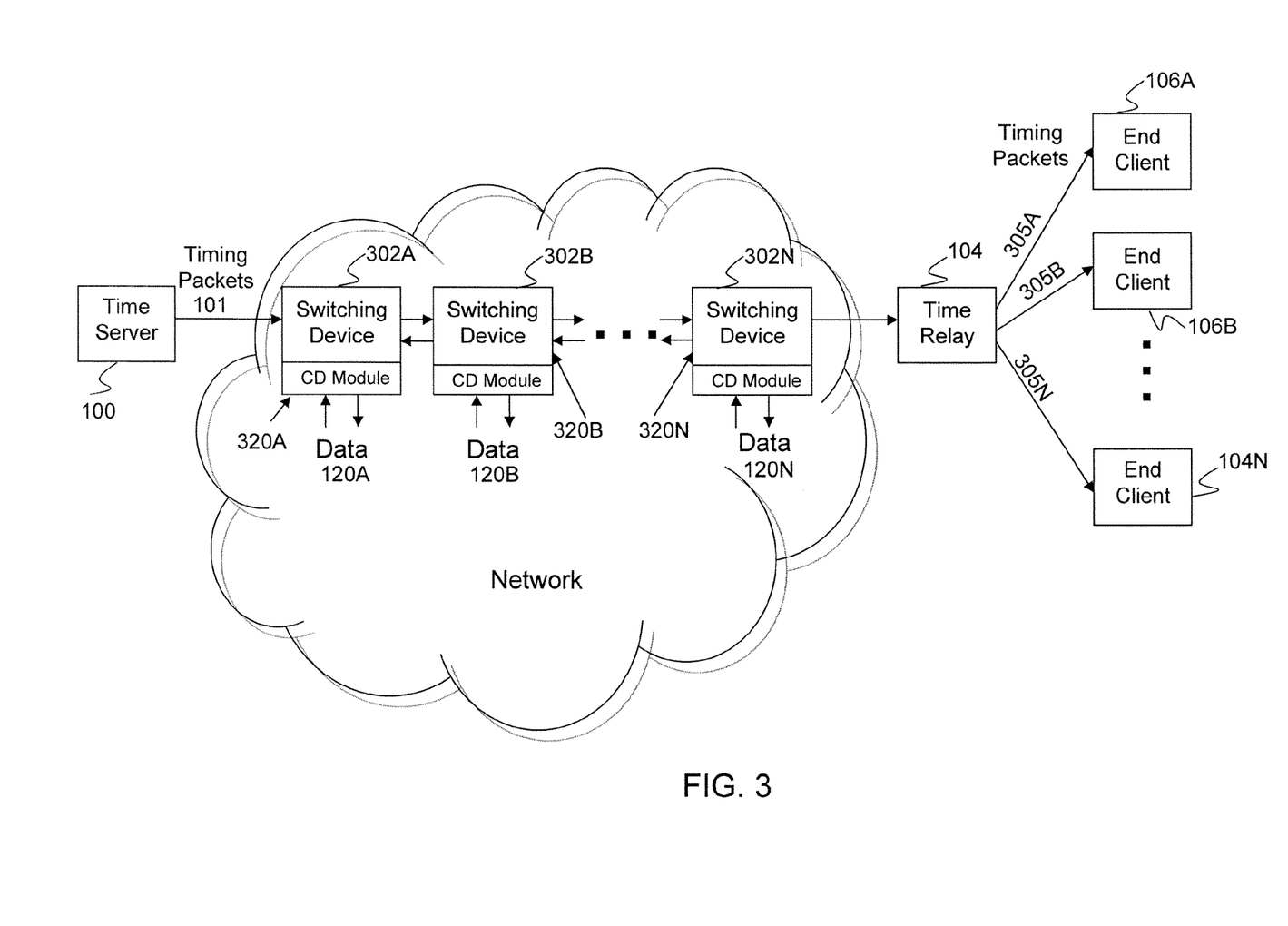
FIG. 3 illustrates an embodiment of the network architecture of FIG. 1 in which a controlled delay function has been added to each switching device in a network, in accordance with one embodiment of the present invention.

FIG. 3 illustrates an embodiment of the network architecture of FIG. 1 in which a controlled delay module 320 inserts a controlled delay packet forwarding function in each switching device 302 in a network 310, in accordance with one embodiment of the present invention. The time relay server 104 may generate and transmit timing information contained in timing packets 305A-305N to the clients 106A-106N. The clients 106 may synchronize to the timing packets 305 received from the time relay server 104. In one embodiment, the controlled delay module 320 may be a transit queuing mechanism that applies a controlled delay to a subset of packets identifiable as controlled delay packets. This subset of packets may include only timing packets 101, or may include timing packets 101 and additional non-timing-related packets.

Figure 4:
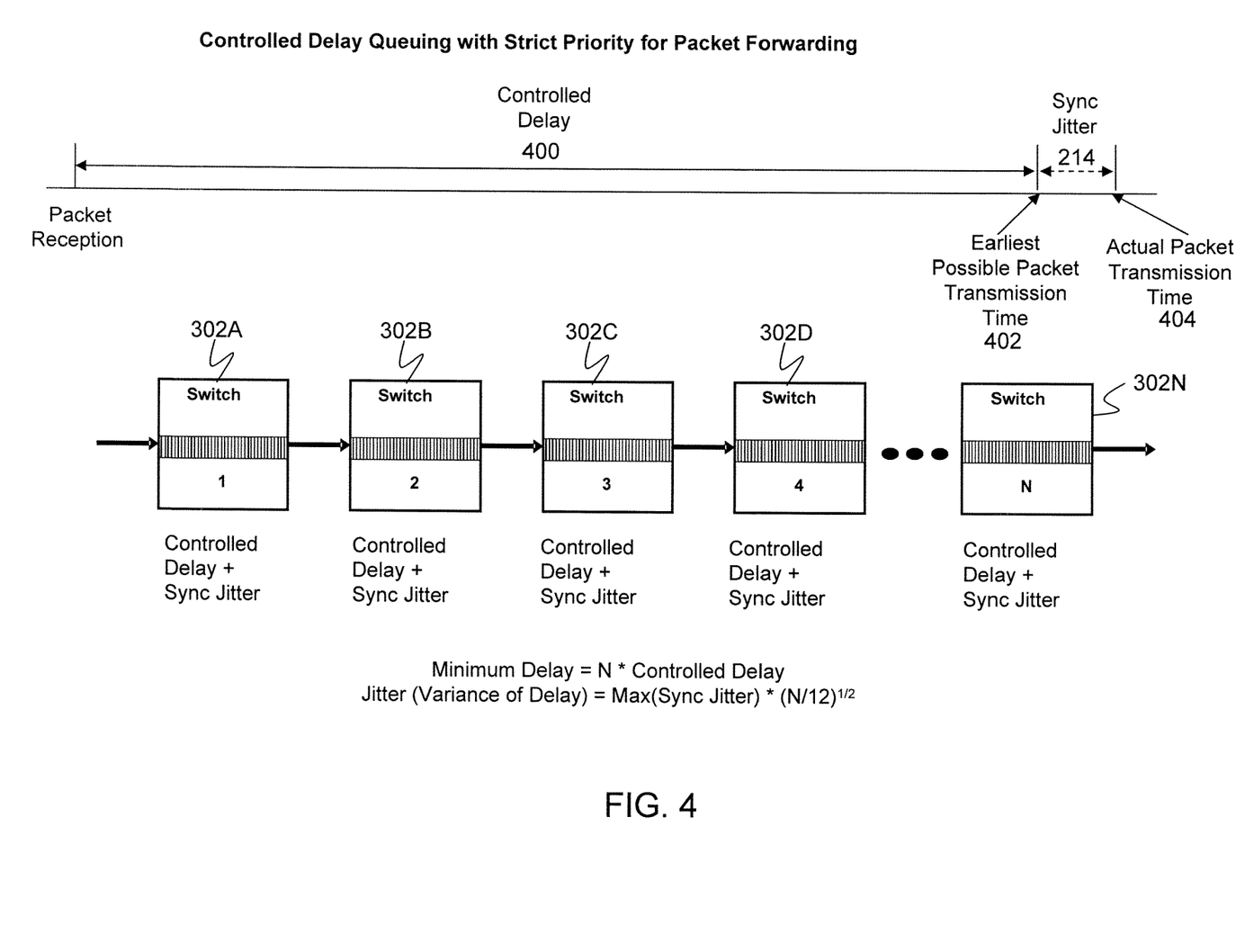
FIG. 4 illustrates the application of a controlled delay by the controlled delay packet forwarding function in network switches to eliminate MA jitter and NQ jitter, in accordance with one embodiment of the present invention.

FIG. 4 illustrates the application of a controlled delay 400 by the controlled delay module 320 in network switches 302 to eliminate MA jitter 212 and NQ jitter 218, in accordance with one embodiment of the present invention. Controlled delay packet forwarding applies a sufficiently large controlled delay 400 to controlled delay packets so that controlled delay packets do not experience any MA jitter 212 or NQ jitter 218. The controlled delay 400 may have a controlled delay value greater or equal to the transit delay, assuming worst-case MA jitter 212 and NQ jitter 218, that any packet identifiable as a controlled delay packet by the controlled delay module 320 in network switches 302 would experience if transiting a conventional network switch 102. The controlled delay value should be greater or equal to the maximum, across all controlled delay packets, of (MA minimum delay 210+MA jitter 212+NQ minimum delay 216+NQ jitter 218) were those packets to traverse a conventional network switch 102. The controlled delay value should therefore be greater than an MTU interval (worst-case NQ jitter 218) plus an IPG interval (worst-case MA jitter 212). This controlled delay value may be configurable by the network operator.

A controlled delay packet transiting network switch 302, such as a timing packet 101, may experience as little delay as (Controlled delay 400) from reception at network switch 302 to transmission at the earliest possible packet transmission time 402. In this case, the synchronization jitter 214 is zero. Generally a packet traversing network switch 302 may experience a delay of (Controlled delay 400+Synchronization jitter 214) before transmission at the actual packet transmission time 404. This shows that controlled delay packet forwarding can eliminate MA jitter 212 and NQ jitter 218, leaving only the much smaller synchronization jitter 214. The minimum transit delay accumulated through N network switches 302 may be N*(Controlled delay 400). The jitter through N network switches 102 may be uniformly distributed with standard deviation (Max (Synchronization jitter 214))*(N/12)$^{1/2}$.

Though the minimum transit delay for controlled delay packet forwarding is larger than for conventional store-and-forward queuing, this delay is still acceptable for conventional real-time services. For example, assuming that all controlled delay packets are 64 bytes and have strict priority over all data packets 120, the controlled delay 400 for a network switch 102 in a 100 Mbps Ethernet network with a 1518 byte MTU and a 96-bit IPG may be set to at least (960 nanoseconds+121.44 microseconds)=122.4 microseconds. The delay through 100 network switches 102 is then approximately 12.2 milliseconds.

Conceptually, the minimum transit delay can be thought of as the upper bound for delay in the conventional store-and-forward network, excluding the small synchronization jitter 214. The standard deviation of the synchronization jitter 214 accumulated through 100 network switches 102 in a 100 Mbps Ethernet network is 28.86 nanoseconds, as described earlier. This jitter is small and statistically well behaved, and may be low-pass filtered at the time relay server 104 and/or the clients 106 to derive a highly accurate reproduction of the original timing information provided by the timing source 100.

In one embodiment, there may be an additional source of jitter beyond the synchronization jitter 214 that is not eliminated by the application of the controlled delay 400. This jitter may result from pre-emption of controlled delay packets by pre-emptive priority packets generated by network switches 302. Controlled delay packets should have a higher transmission priority than data packets 120; without pre-emption, this higher transmission priority ensures that each controlled delay packet can be transmitted at the expiration of the controlled delay 400 (plus a small synchronization jitter 214 that is independent of data packets 120). However, controlled delay packets have a lower transmission priority than pre-emptive priority packets. One reason for this is that pre-emptive priority packets may include control packets, such as keep-alive indicators or packets communicating alarm conditions, which are essential to the stable and predictable operation of network switches 302. This pre-emptive priority traffic is generally of low bandwidth but requires urgent attention. The higher transmission priority of pre-emptive priority packets as compared to controlled delay packets means that a controlled delay packet may not be transmittable at the expiration of the controlled delay 400 due to an ongoing transmission of a pre-emptive priority packet. The controlled delay packet may then be dropped, since the controlled delay packet requires controlled delay forwarding but may not require guaranteed delivery. For example, timing packets 101 may be sent periodically, so a given timing packet 101 that experiences jitter above the synchronization jitter 214 may no longer be useful. The controlled delay packet may also be transmitted at the first available time that there is no pre-emptive priority packet being transmitted or waiting to be transmitted.

Figure 5:
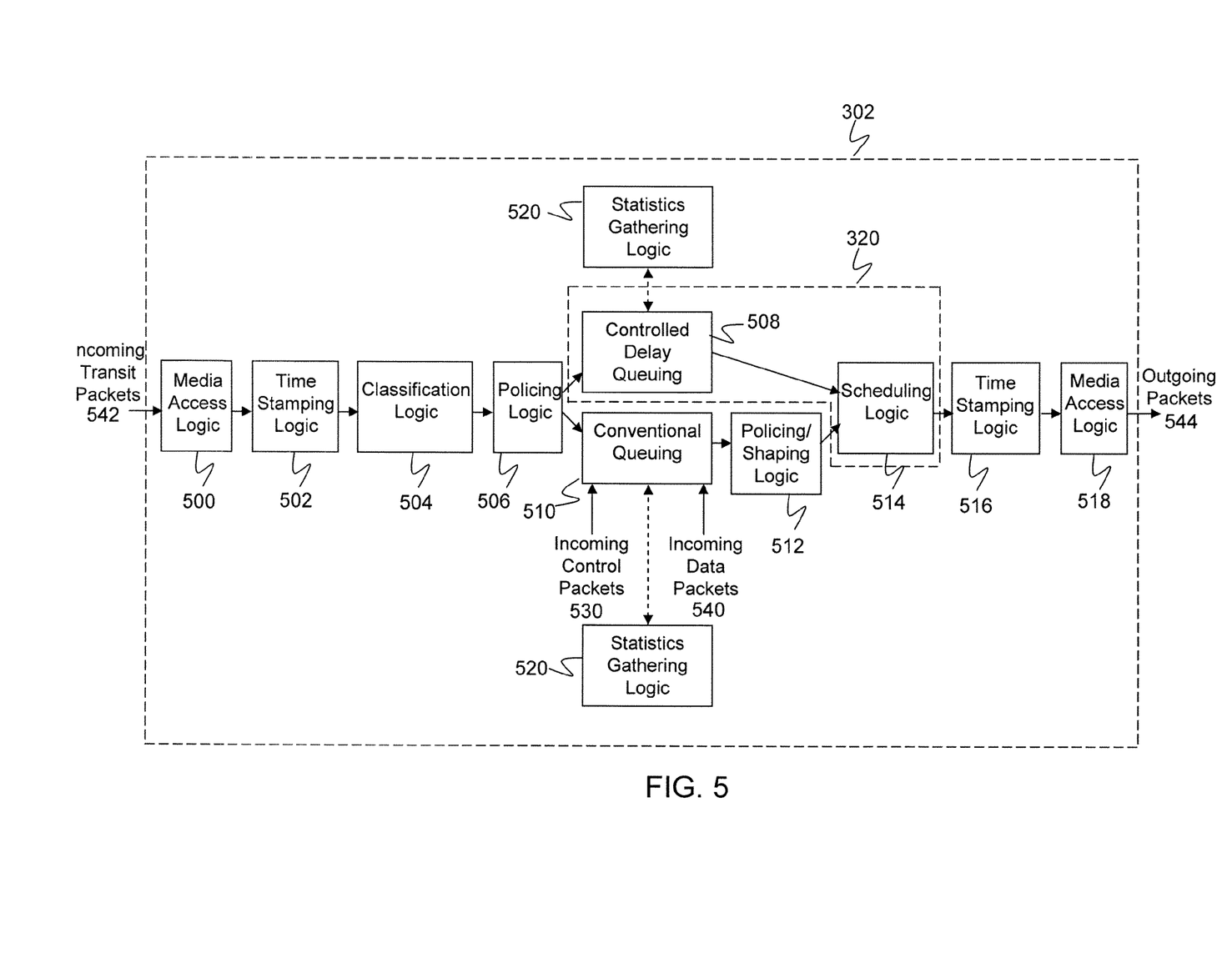
FIG. 5 illustrates a logical block diagram of the main functional blocks impacting packet traffic transiting a network switch with a controlled delay packet module, in accordance with one embodiment of the present invention.

FIG. 5 illustrates a logical block diagram of the main functional blocks impacting packet traffic transiting a network switch 302 with a controlled delay module 320, in accordance with one embodiment of the present invention.

FIG. 5 shows one transit path with incoming transit packets 542 and outgoing packets 544 resulting from the merging of the transit packets 542 with incoming control packets 530 and incoming data packets 540 from the network switch 302. For a bi-directional network switch 302, there are typically two transit paths. A transit path of the network switch 302 may be implemented as one or more integrated circuits, field programmable gate arrays, network processors, or other configurable or programmable hardware components.

In one embodiment, the controlled delay module 320 includes the controlled delay queuing logic 508 and the scheduling logic 514. It will be understood that, in other embodiments, the controlled delay module 320 may, in addition to the controlled delay queuing logic 508 and the scheduling logic 514, include other logic modules shown in FIG. 5.

An incoming transit packet 542 is received by the media access logic 500 of the network switch 302. The media access logic 500 may perform receive functions associated with the physical layer and media access control sublayer of the Open Systems Interconnection (OSI) reference model for networking protocol layers. The timestamp processing logic 502 may then attach time-stamp information to the transit packet 542 indicating the time that the transit packet 542 is received at the timestamp processing logic 502. This time may be referenced to a global time reference such as the Global Positioning System (GPS), or to a local time reference that has meaning only at the network switch 302. The classification logic 504 may then process the transit packet 542 to determine whether the transit packet 542 is a controlled delay packet such as a NTP broadcast packet, a pre-emptive priority packet such as a keep-alive control packet or an auto-ranging packet, or a packet of a typical priority level for packet services, such as Expedited Forwarding (EF), Assured Forwarding (AF), or Best Effort (BE) as defined by the Internet Engineering Task Force (IETF) Differentiated Services Working Group. In one embodiment, a control packet such as an auto-ranging packet may be looped back by the classification logic 504 on the first transit path to a second transit path. This loopback traffic may then be multiplexed with the output of classification logic on the second transit path.

The policing logic 506 may determine the admissibility of the transit packet 542 to the controlled delay queuing logic 508. Contention of transit packets 542 with loopback packets from the classification logic 564 (on the transit path for the opposite direction) may be resolved by policing or shaping the loopback packets. Packets that are inadmissible to the controlled delay queuing logic 508 may be directed to conventional queuing logic 510. The conventional queuing logic 510 may include multiple queues, such as one queue each for pre-emptive priority packets, EF packets, AF packets, and BE packets. Incoming control packets 530, such as control packets generated by a central processing unit (CPU) running software managing the network switch 302, may be queued in the pre-emptive priority queue. Incoming data packets 540, which may include data packets 120, may be queued in the EF, AF, or BE queues.

The controlled delay queuing logic 508 may hold the transit packet 542 until a queuing time reaches a controlled delay value. When the controlled delay queuing logic 508 determines that the queuing time of the transit packet 542 has reached the controlled delay value, the controlled delay queuing logic 508 may provide an indication to the scheduling logic 514. The controlled delay value may be predetermined, or a configurable fixed number of clock cycles that is equal to or greater than the maximum transmission unit (MTU) plus inter-packet gap (IPG) size of the applicable MAC protocol. In one embodiment, the queuing time may start upon arrival of the transit packet 542 at the controlled delay queuing logic 508. The controlled delay queuing logic 508 can store the transit packet 542 for the full controlled delay value. In another embodiment, the queuing time may start at the time indicated in the time-stamp information attached to transit packet 542 by the timestamp processing logic 502. The controlled delay queuing logic 508 can access the time-stamp information attached to transit packet 542 by the timestamp processing logic 502, and can determine to queue the transit packet 542 until a controlled delay value after the time indicated in the time-stamp information attached to transit packet 542. The controlled delay queuing logic 508 may be implemented as a first-in first-out (FIFO) memory, or as a linked list with an associated egress time-stamp equal to the time-stamp information attached to transit packet 542 by the timestamp processing logic 502 plus the controlled delay value.

The scheduling logic 514 may schedule packets queued by the controlled delay queuing logic 508 and the conventional queuing logic 510. This scheduling may be based on a priority scheme that enables selection of a packet from the controlled delay queue, the pre-emptive priority queue, or one of the EF, AF, and BE queues. Conceptually, as described earlier, the scheduling logic 514 may transmit packets from the pre-emptive priority queue with highest priority, then in descending order packets from the controlled delay queue, the EF queue, the AF queue, and the BE queue. Or priority among the queues can be determined in any manner consistent with the desired network behavior. The scheduling logic 514 should ensure that each packet transmitted from the controlled delay queue is transmitted when the queuing delay for that packet reaches the controlled delay value, except for the small additional synchronization jitter 214. If the transmission of a controlled delay packet is delayed beyond when the queuing delay reaches the controlled delay value due to ongoing transmission of a pre-emptive priority packet, then the scheduling logic 514 may indicate to the controlled delay queuing logic 508 to drop the controlled delay packet in its entirety. In this embodiment, the scheduling logic 514 allows any packet in the process of transmission, independent of its source queue, to continue to transmit until completion.

Statistics gathering logic 520 gathers statistics associated with the operation of the controlled delay queuing logic 508 and the conventional queuing logic 510, such as counts of transmitted and dropped packets in each queue and for each ingress and egress port of the network switch 302. The ingress and egress ports may be physical ports or logical ports. The statistics gathering logic 520 may also gather statistics associated with any other logic block. The policing/shaping logic 512 may police or shape pre-emptive priority packets. This policing or shaping, by limiting the average rate in bytes per second and burst size in bytes available for pre-emptive priority traffic to small values, may minimize the impact of the pre-emptive priority traffic on constant delay traffic.

The scheduling logic 514 selects the transit packet 542, the control packet 530, or the data packet 540 as an outgoing packet 544 for transmission. The time-stamping logic 516 may then remove any time-stamp information attached to the outgoing packet 544, such as time-stamp information attached to the transit packet 542 by the timestamp processing logic 502. There may be no time-stamp information attached to the outgoing packet 544 if that packet is the control packet 530 or the data packet 540. The outgoing packet 544 is then transmitted to media access logic 518 and subsequently transmitted out of the network switch 302.

Figure 6:
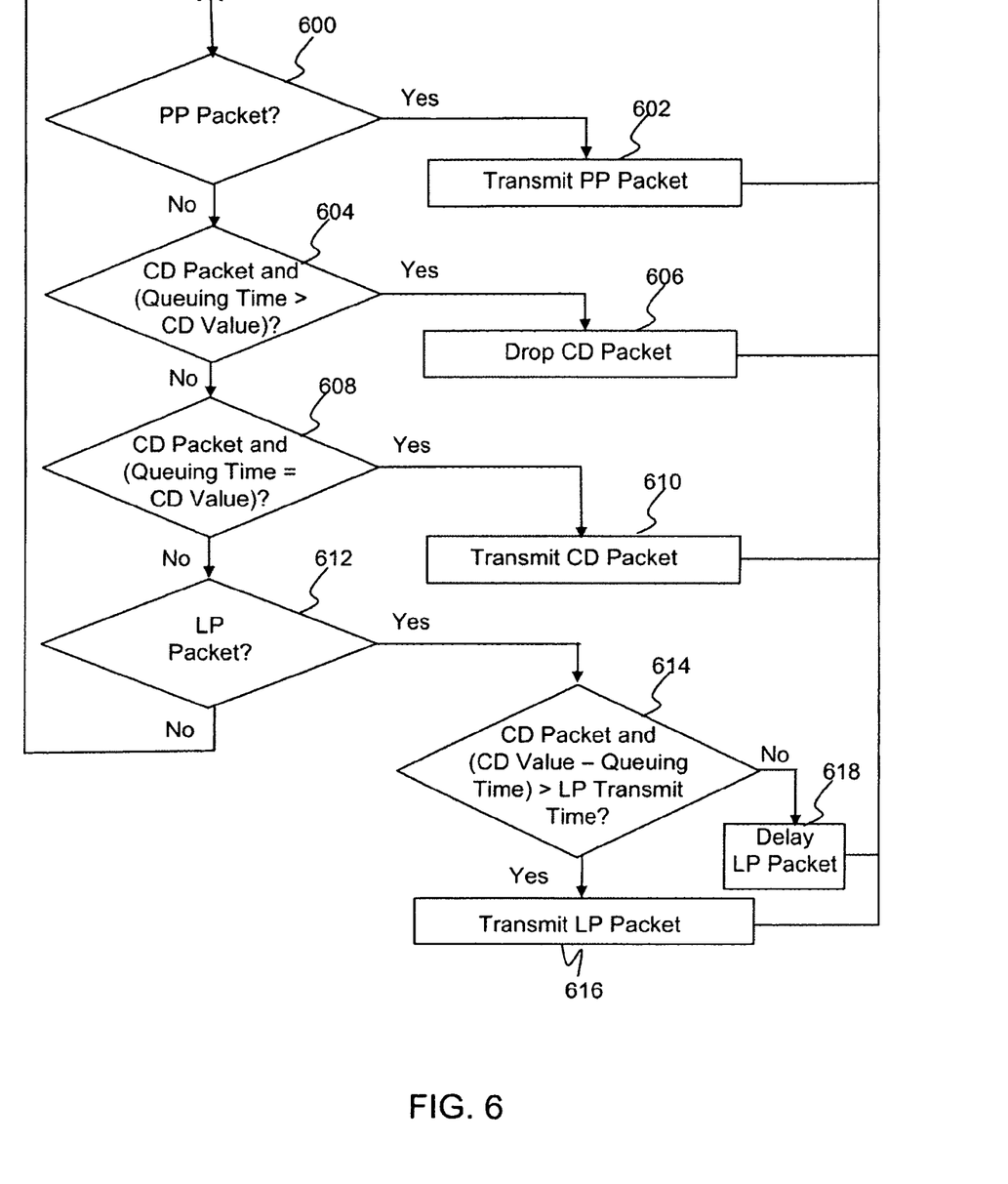
FIG. 6 illustrates operations associated with the scheduling of pre-emptive priority, controlled delay, and other lower priority packets, in accordance with one embodiment of the present invention.

FIG. 6 illustrates operations associated with the scheduling of pre-emptive priority, controlled delay, and other lower priority packets, in accordance with one embodiment of the present invention. The scheduling logic 514 checks if there is a pre-emptive priority packet ready for transmission (block 600). The scheduling logic 514 may check with the conventional queuing logic 510 to determine if a pre-emptive priority packet is queued, and the policing/shaping logic 512 to determine if there are enough tokens in the policer/shaper to allow the transmission of the pre-emptive priority packet at the head of the queue. If there is a pre-emptive priority packet ready for transmission, then the scheduling logic 514 may schedule the transmission by indicating to the conventional queuing logic 510 to transmit the pre-emptive priority packet (block 602). If not, the scheduling logic 514 checks if there is a controlled delay packet ready for transmission, and if the queuing time of the controlled delay packet exceeds the controlled delay value (block 604). If so, the scheduling logic 514 may indicate to the controlled delay queuing logic 508 to drop the controlled delay packet (block 606). If not, the scheduling logic 514 checks if there is a controlled delay packet ready for transmission, and if the queuing time of the controlled delay packet equals the controlled delay value (block 608). It is assumed in this figure that the scheduling logic 514 operates with infinite speed so that the check of block 608 is executed simultaneously with the queuing time of the controlled delay packet reaching the controlled delay value. In a real implementation, block 608 may need to check whether there is a controlled delay packet ready for transmission, and if the queuing time is greater or equal to the controlled delay value and less than or equal to the controlled delay value plus a small tolerance. If the check of block 608 is met, then the scheduling logic 514 may schedule the transmission by indicating to the controlled delay queuing logic 508 to transmit the controlled delay packet (block 610). If not, the scheduling logic 514 checks if there is a lower priority packet, such as an EF, AF, or BE packet, ready for transmission (block 612). If not, the scheduling logic 514 returns to block 600. If so, the scheduling logic 514 checks if there is a controlled delay packet ready for transmission, and if the difference between the controlled delay value and the queuing time of the controlled delay packet is greater than the time that it would take to transmit the lower priority packet (block 614). In this step, the scheduling logic 514 is determining whether to delay transmission of the lower priority packet so that the controlled delay packet can be transmitted when the queuing time reaches the controlled delay value. If the check in block 614 is met, the scheduling logic 514 may schedule the transmission by indicating to the conventional queuing logic 510 to transmit the lower priority packet (block 616). Control then returns to block 600. In this case, the transmission of the lower priority packet can complete before the queuing time reaches the controlled delay value, so the controlled delay packet can be transmitted when the queuing time reaches the controlled delay value. If not, the scheduling logic 514 may delay the transmission of the lower priority packet (block 618) and returns to block 600.

In one embodiment, to determine whether to transmit a lower priority packet, the scheduling logic 514 may track the length of the packets at the heads of each transmit queue in the conventional queuing logic 510, and the free time in the controlled delay queuing logic 508. The free time is the time until the next controlled delay packet is to be forwarded. If a packet from the controlled delay logic is in the process of transmission, the free time is zero. In the case that the free time is greater than zero, the scheduling logic 514 then examines the various packet lengths of the packet at the head of each of the queues in the conventional queuing logic 510. The highest priority packet with transmission duration less than the free time is transmitted. This ensures that no packet of lower priority will inadvertently contend or collide with a packet transmitted by the controlled delay queuing logic 508.

In block 612, the scheduling logic 514 may check across multiple queues that may have a strict priority relationship, such as, in descending order, EF, AF, and BE queues. If there is an EF packet ready for transmission, the scheduling logic 514 may proceed to block 614. If there is no EF packet ready for transmission, the scheduling logic 514 may then check if there is an AF packet ready for transmission. If there is an AF packet ready for transmission, the scheduling logic 514 may proceed to block 614. If there is no AF packet ready for transmission, the scheduling logic 514 may then check if there is an BE packet ready for transmission. If there is a BE packet ready for transmission, the scheduling logic 514 may proceed to block 614. If there is no BE packet ready for transmission, the scheduling logic 514 may return to block 600.

From the foregoing, it can be seen that an apparatus and method for controlled delay packet forwarding are described. The foregoing description, for purposes of explanation, used specific nomenclature to provide a thorough understanding of the invention. It will be appreciated, however, that embodiments of the invention can be in other specific forms without departing from the spirit or essential characteristics thereof. The described embodiments are not intended to be exhaustive or to limit the invention to the precise forms disclosed; obviously, many modifications and variations are possible in view of the above teachings. The presently disclosed embodiments are, therefore, considered in all respects to be illustrative and not restrictive. The embodiments were chosen and described in order to best explain the principles of the invention and its practical applications; they thereby enable others skilled in the art to best utilize the invention and various embodiments with various modifications as are suited to the particular use contemplated. It is intended that the following claims and their equivalents define the scope of the invention.

What is claimed is:

1. An apparatus to forward packets with controlled delay, comprising:

first logic to hold a packet in a first class for a quelling time of a predetermined controlled delay value;

scheduling logic to delay transmission of the packet in the first class until the queuing time reaches the predetermined controlled delay value, and to determine whether to delay transmission of a packet in a second class to allow the transmission of the packet in the first class when the queuing time reaches the predetermined controlled delay value; and time-stamping logic to attach time-stamp information including a time value to the packet in the first class;

wherein the scheduling logic delays transmission of the packet in the second class in response to determining that transmission of the packet in the second class would complete after the queuing time reaches the predetermined controlled delay value;

wherein the first logic accesses the time-stamp information;

wherein the queuing time starts at the time value and ends at the predetermined controlled delay value after the time value; and wherein the predetermined controlled delay value is independent of the time value.

2. The apparatus of claim 1, wherein the scheduling logic determines whether to delay transmission of a packet in a third class to allow the transmission of the packet in the first class when the queuing time reaches the predetermined controlled delay value.

3. The apparatus of claim 2, wherein the scheduling logic schedules the transmission of the second class of packets with strictly higher priority than the transmission of the third class of packets.

4. The apparatus of claim 1, wherein the predetermined controlled delay value is configurable.

5. The apparatus of claim 1, wherein the predetermined controlled delay value is greater than a maximum transmission unit interval plus an inter-packet gap interval.

6. The apparatus of claim 1, wherein the lime-stamp information is accessed by the first logic as part of determining when the queuing time reaches the predetermined controlled delay value.

7. The apparatus of claim 1, further comprising policing logic to determine whether to send a packet to the first logic.

8. An apparatus to forward packets with controlled delay, comprising:
   first logic to hold a packet in a first class for a queuing time of a predetermined controlled delay value;
   scheduling logic to delay transmission of the packet in the first class until the queuing time reaches the predetermined controlled delay value, and to determine whether to delay transmission of a packet in a second class to allow the transmission of the packet in the first class when the queuing time reaches the predetermined controlled delay value;
   wherein the scheduling logic transmission of the packet in the second class in response to determining that transmission of the packet in the second class would complete after the queuing time reaches the predetermined controlled delay value; and
   wherein the scheduling logic schedules the transmission of a packet in a pre-emptive priority class, and wherein the first logic the packet in the first class if the queuing time exceeds the controlled delay value.

9. The apparatus of claim 8, wherein the first class of packets comprise network timing packets.

10. The apparatus of claim 8, further comprising shaping logic to shape packets in the pre-emptive priority class.

11. The apparatus of claim 8, further comprising policing logic to police packets in the pre-emptive priority class.

12. A method for forwarding packets with controlled forwarding delay, comprising:
   delaying transmission of a packet in a first class until a queuing time of the packet in the first class reaches a predetermined controlled delay value;
   determining whether to delay transmission of a packet in a second class to allow the transmission of the packet in the first class when the queuing time reaches the predetermined controlled delay value;
   delaying transmission of the packet in the second class in response to determining that transmission of the packet in the second class would complete after the queuing time reaches the predetermined controlled delay value;
   transmitting a packet in a pre-emptive priority class; and
   dropping the packet in the first class if the transmission of the packet in the pre-emptive priority class completes after the queuing time exceeds the predetermined controlled delay value.

13. The method of claim 12, further comprising determining whether to delay transmission of a packet in a third class to allow the transmission of the packet in the first class when the queuing time reaches the predetermined controlled delay value.

14. The method of claim 12, further comprising:
   time-stamping the packet in the first class with time-stamp information; and
   determining the queuing time based on the time-stamp information.

15. The method of claim 12, further comprising shaping packets in the pre-emptive priority class.

16. A method for synchronizing a client to a time server, comprising:
   generating timing packet information at the time server;
   forwarding the timing packet information through at least one switching device, wherein the forwarding at each of the at least one switching device includes:
      delaying transmission of the timing packet information until a queuing time of the timing packet information reaches a predetermined controlled delay value;
      determining whether to delay transmission of data packet information until after the queuing time of the timing packet information reaches the predetermined controlled delay value; and
      delaying transmission of the data packet information in response to determining that transmission of the data packet information would complete after the queuing time reaches the predetermined controlled delay value;
   receiving the timing packet information at the client;
   synchronizing the timing of the client based on processing of the timing packet information;
   transmitting control packet information in a pre-emptive priority class; and
   dropping the timing packet information if the transmission of the control packet information completes after the queuing time exceeds the predetermined controlled delay value.

17. The method of claim 16, wherein forwarding further comprises:
   time-stamping the timing packet information with time-stamp information; and
   determining the queuing time based on the time-stamp information.

* * * * *